R. J. HETTENBAUGH & G. H. GREGORY.
COUPLING.
APPLICATION FILED AUG. 17, 1915.

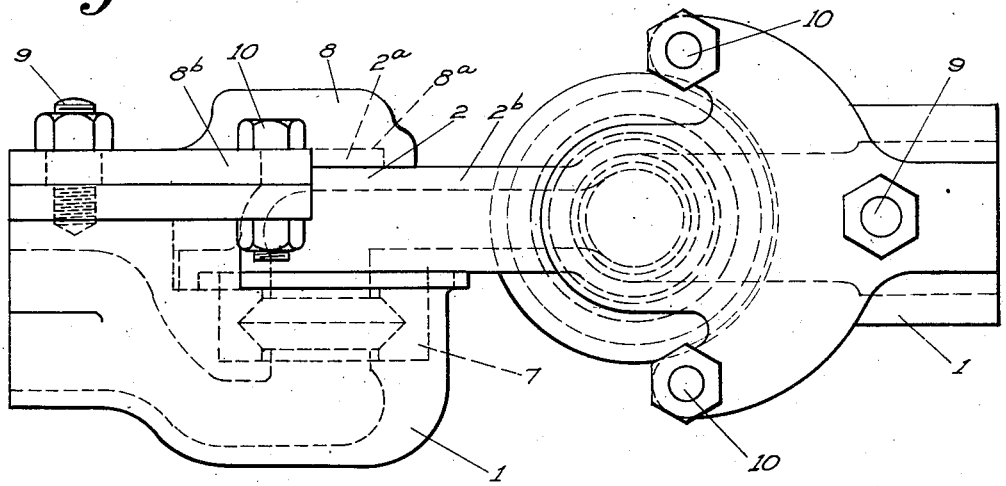
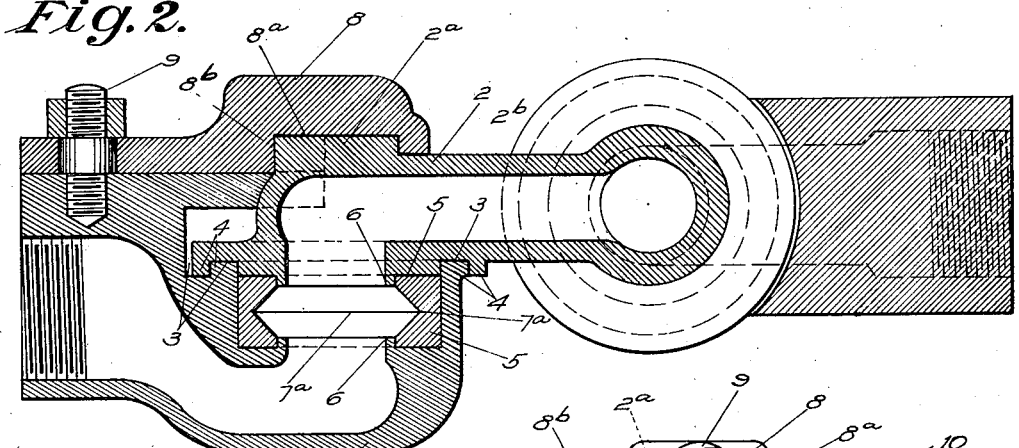
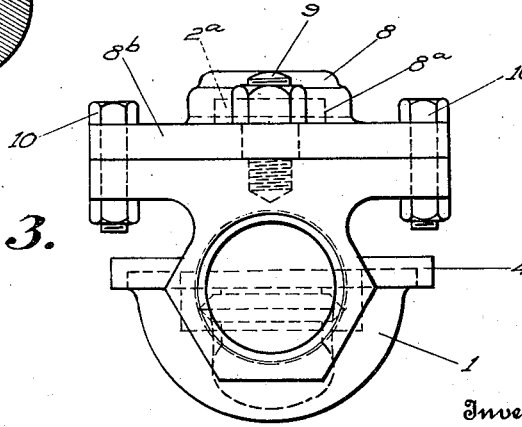

1,185,666.

Patented June 6, 1916.
2 SHEETS—SHEET 2.

Witness
A. Schrader

Inventor
RAY J. HETTENBAUGH
GEORGE H. GREGORY
By Ged B Billman their Attorney

UNITED STATES PATENT OFFICE.

RAY JAMES HETTENBAUGH AND GEORGE H. GREGORY, OF MOUNT CARMEL, ILLINOIS.

COUPLING.

1,185,666.   Specification of Letters Patent.   Patented June 6, 1916.

Application filed August 17, 1915. Serial No. 45,889.

*To all whom it may concern:*

Be it known that we, RAY J. HETTENBAUGH and GEORGE H. GREGORY, citizens of the United States, residing at Mount Carmel, in the county of Wabash and State of Illinois, have invented certain new and useful Improvements in Couplings, of which the following is a specification.

Our invention relates to improvements in couplings, and more particularly to improvements in metallic flexible couplings, the present embodiment being particularly designed and adapted for use in connection with metallic pipe sections or conduits in forming the air line coupling between cars in lieu of the ordinary rubber air hose and coupling heads now in use for such purpose. The present form of coupling is adapted to be interchangeable with the standard hose connections or couplings now in use on all cars using air brakes.

The primary object of the invention is to provide a generally improved flexible metallic coupling of simple, cheap, and efficient construction for use in connection with high pressure fluid conduits, and it is apparent that the improved coupling may be readily adapted for use wherever a flexible coupling is desired in connection with such conduits.

A further object is the provision of coupling members or sections having concentrically grooved and flanged interlocking faces provided with gasket receiving and retaining spaced grooves and flanges adapted to receive and coöperate with an improved expansible gasket having a V-shaped groove or channel on its inner periphery extending outwardly from and bridging the space between the gasket retaining flanges of the abutting faces of the coupling sections or members so that fluid under pressure will expand the edges of the grooved ring or gasket and form a fluid tight joint in accordance with the pressure thereby permitting the coupling members or sections to be freely rotated or moved relative to each other in a circular direction without the escape of fluid therefrom.

With the above mentioned and other ends in view, the invention consists in the novel construction, arrangement, and combination of parts, hereinafter described, illustrated in one of its embodiments in the accompanying drawings, and particularly pointed out in the appended claims.

Figure 4:
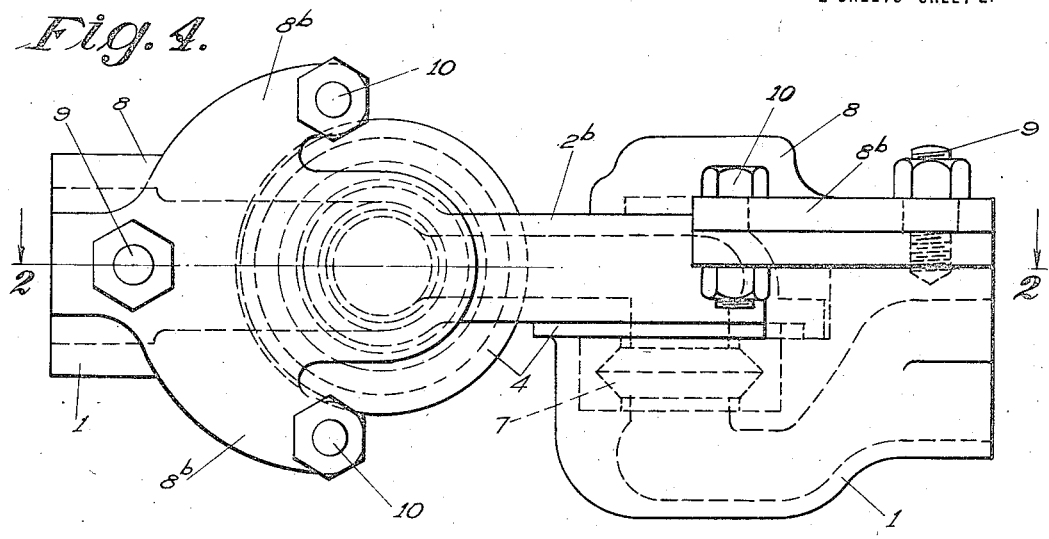
Figure 5:
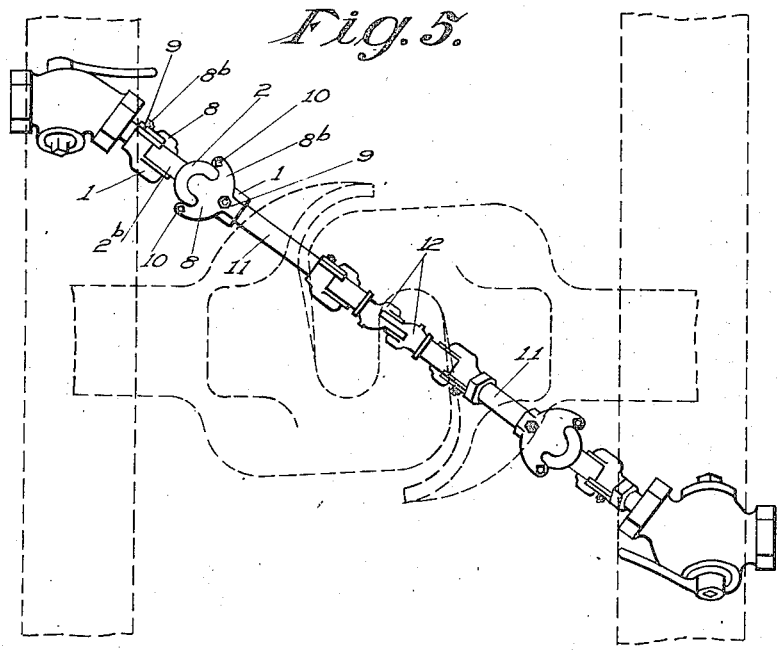

Referring to the drawings forming a part of this specification, Figure 1, is a top plan view of a pair of couplings particularly designed and connected for use in connection with metallic pipe sections in forming the air line coupling between cars in lieu of the ordinary rubber hose sections and as more particularly illustrated in Fig. 5 of the drawings. Fig. 2, a longitudinal sectional view taken on line 2—2 of Fig. 4. Fig. 3, a reduced end elevation of one of the coupling members or sections detached. Fig. 4, a side elevation of the same. Fig. 5, a top plan view of the same connected to a suitable number of metallic pipe sections or conduits and conventional air line fittings to form a complete air line coupling or connection between the cars.

Similar numerals of reference designate like parts throughout all the figures of the drawings.

The improved coupling comprises a pair of coupling members or sections 1, and 2, provided with concentrically grooved and flanged interlocking faces, said faces being rotatably connected and extending at right angles to their axes of rotation. The lateral or abutting faces of the coupling members are provided with concentrically arranged annular grooves and flanges 3 and 4, respectively, adapted to receive and take into each other, and as a means of forming a fluid tight joint under all conditions and under varying pressures, said face portions of the coupling members are further provided with spaced concentric gasket receiving and retaining annular grooves and flanges 5 and 6, respectively, said grooves and flanges 5 and 6, being adapted to receive and retain an improved expansible resilient gasket or ring 7, and as a means of causing said gasket to expand in accordance with fluid pressure and to correspondingly coöperate with the flanged and grooved faces of the coupling members or sections, said gasket is provided about its inner periphery with a V-shaped groove or channel 7$^a$, extending outwardly from and bridging the space between the gasket retaining flanges 6, thereby not only resiliently filling the space between the faces of the coupling members but forming an annular resilient bridging wall between the coupling members for the fluid in passing through the conduits.

As a means of removably and rotatably retaining the coupling members or sections 1 and 2, in position the coupling member or section 1, is provided with a retaining cap or head 8, having a circular or disk shaped socket 8$^a$, adapted to receive and fit over a similarly shaped head or projection 2$^a$, on the coupling member 2, said retaining cap or head being preferably secured by means of a stud bolt 9, and being preferably provided with curved lateral wings 8$^b$, secured to similarly shaped adjacent wings on the coupling section 1, by means of securing bolts 10.

In adapting the coupling members for use as an air brake pipe coupling the coupling members 2, may be provided with an extended conduit portion 2$^b$, terminating in a similarly shaped head arranged at right angles to the first mentioned head in connecting to a second coupling member 1, similar to that hereinbefore described, and as illustrated in Figs. 1, 2 and 4, of the drawings.

The coupling members 1, are preferably internally threaded (see Fig. 2) so that they may be readily attached to suitable metallic pipe sections 11, as shown in Fig. 5, and the coupling sections 2, may be secured to suitable interchangeable coupling heads 12, as shown in Fig. 5, to form a complete air brake coupling, said interchangeable heads 12, being adapted to connect with the conventional forms of coupling heads now used on ordinary air brake hose.

From the foregoing description, taken in connection with the accompanying drawings, the operation and advantages of our invention will be readily understood.

Having thus described one of the embodiments of our invention, what we claim and desire to secure by Letters Patent, is,—

1. A coupling, comprising coupling sections having right angled concentrically grooved and flanged interlocking faces, said sections having annular axially alined gasket retaining spaced face flanges, and a gasket interposed between and engaged and surrounded on its inner periphery by said annular face flanges and having a V-shaped inner periphery extending outwardly from and bridging the space between the same, said V-shaped portion of said gasket forming an enlarged port or passage between said coupling sections.

2. In a coupling, a pair of coupling members having spaced disk shaped faces provided with spaced axially coincident gasket retaining flanges, and a resilient gasket interposed between said faces and surrounding said flanges, said gasket being provided about its inner periphery with a circumferential V-shaped groove extending outwardly from and terminating at the edges of said flanges and forming an enlargement of the port or passage between said coupling members.

3. In a coupling, the combination with coupling members having rotatably mounted disk shaped faces and provided with annular axially alined substantially spaced grooves and flanges surrounding the bore of said coupling members; of a resilient gasket seated in and filling the space between said grooves and provided with a circumferential groove about its inner periphery forming an enlargement of said bore, said gasket having the upper and lower marginal edges of its inner periphery surrounding said flanges and having resilient expansible walls bridging the space between the same.

4. A coupling, comprising coupling sections having disk shaped lateral faces rotatably interlocking with each other, said faces being provided with gasket receiving and retaining coincident annular grooves and flanges spaced from each other, and a resilient gasket mounted in and interposed between said grooves and flanges and provided with a V-shaped channel on its inner periphery, the sides of said V-shaped channel terminating at and extending outwardly from and bridging the space between said annular gasket retaining flanges, said V-shaped channel forming an enlargement in the port or passage between said coupling members.

5. In a coupling, the combination with a pair of coupling sections having rotatably connected faces and concentric exterior head and socket members, one of which is removable, said faces being provided with gasket receiving and retaining axially alined annular grooves and flanges spaced from each other; of a gasket seated in and filling the space between said spaced grooves and having the upper and lower marginal edges of its inner periphery surrounding said flanges and provided with a V-shaped channel extending outwardly from and bridging the space between the same, said V-shaped channel and gasket forming an enlarged passage having resilient expansible walls between said coupling sections.

In testimony whereof we have affixed our signatures in presence of two witnesses.

RAY JAMES HETTENBAUGH.
GEORGE H. GREGORY.

Witnesses:
 CHAS. PAINTER,
 A. KING.